April 7, 1936.                    M. POHONTSCH                    2,036,495
                                   GENERATOR
                               Filed June 16, 1933
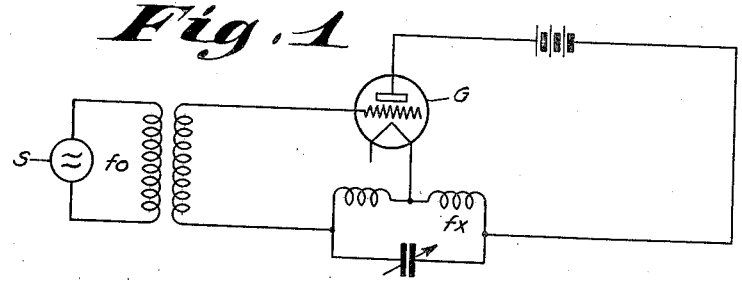
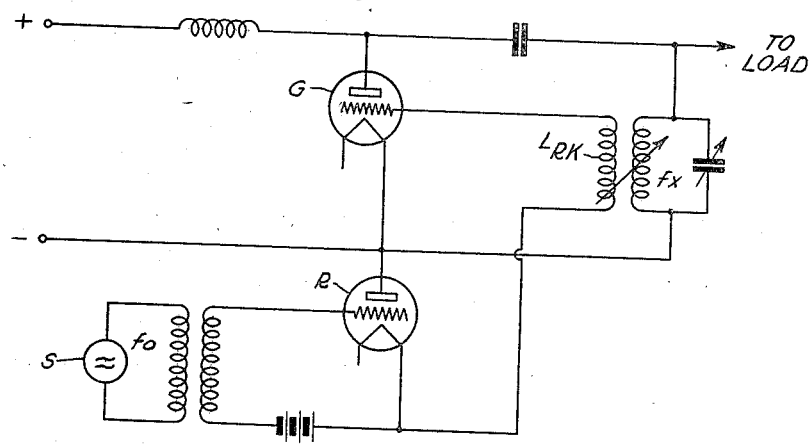
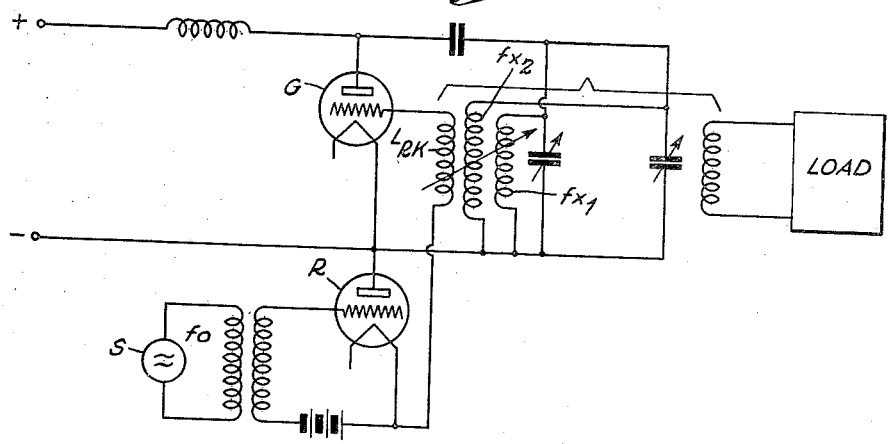
INVENTOR
MAX POHONTSCH
BY J. S. Grover
ATTORNEY Patented Apr. 7, 1936

2,036,495

UNITED STATES PATENT OFFICE 2,036,495

GENERATOR

Max Pohontsch, Berlin, Germany, assignor to Telefunken Gesellschaft für Drahtlose Telegraphie m. b. H., Berlin, Germany, a corporation of Germany Application June 16, 1933, Serial No. 676,068
In Germany June 20, 1932

4 Claims. (Cl. 250—36)

It is known in the prior art that from a fundamental wave having a frequency $fo$, by the use of frequency changing means, another and new oscillation having a frequency $fx$ may be obtained, the latter bearing an integral relationship to the said fundamental wave. For technical or industrial purposes, cases arise where the fundamental wave is raised or multiplied in order to change a given low frequency into a higher frequency or where the fundamental wave is divided or sub-multiplied, with the opposite end in view. Among the means customarily used for this purpose are static or rotating iron cored frequency converters or changers, involving optionally direct current magnetization, and also electronic tubes.

When electronic tubes are used for frequency changing purposes, see Figure 1, especially for frequency submultiplication (division), it is known to impress the frequency to be divided in the form of a grid alternating voltage upon a self-excited oscillator tube G which in the drawing is shown as a regenerative generator in what is known as the three-point circuit scheme. The natural oscillation of the generator tube corresponds roughly to the desired frequency $fx$ to be obtained at the output end and which bears an integral relationship to the fundamental or input frequency. One essential drawback consists in the mutual reaction between the fundamental wave generator S and the self-excited generator tube G. Now, this drawback is overcome according to the present invention.

In the accompanying drawing Figure 1 merely exemplifies a well known arrangement and Figures 2 and 3 illustrate two different embodiments of the present invention.

A regulable resistance in series with regenerative coupler means $L_{RK}$ is connected in the grid circuit of the self-excited generator tube G, see Figure 2. What is particularly well suited therefor is an electron tube. This results in a circuit scheme which closely resembles the grid direct current modulation scheme known in the prior art, though differing from the latter substantially as regards its action and operation. In the present instance, the grid direct current as well as the grid alternating current of the generator tube must flow by way of this tube. In this there resides one of the basic differences as compared with grid modulation which solely serves to control the grid direct current, whereas the grid alternating current is precluded from the modulator tube by means of a grid choke coil and is shunted capacitively in order that the oscillation to be modulated may be maintained.

According to the invention, furthermore, the generator frequency $fo$ to be converted is fed to the grid of the tube R to be used here as a variable resistance. Regeneration of the self-excited generator whose fundamental or natural wave is substantially equal to the desired output frequency is suitably so set that self-excitation will just fail to arise as long as the grid alternating voltage $fo$ is absent. But as soon as the alternating voltage becomes operative and active at the proper amplitude, and as soon as $fo$ arises at the proper relationship to the frequency $fx$, oscillations will be caused to be set up in the generator circuit.

Apart from the fact that in this arrangement the above mentioned reactions between the fundamental wave generator and the converter device are obviated, the tube R connected in the regenerated grid circuit fulfills a two-fold purpose. During the positive half-wave of $fo$ the conditions for self-excitation of the oscillation $fx$ are given. But the oscillations will be maintained only provided that the liberation of the feed-back by the variable resistance is effected at the proper rate or rhythm, that is to say, always when a whole number of periods has elapsed either in the exciting or the excited oscillation. If this condition is not fulfilled, no self-excitation will happen. This is the effect of the tube R acting here as a variable resistance.

What arises furthermore is a supplemental valve action. In stationary state, the grid alternating voltage acting across the feed-back (tickler) coil $L_{RK}$ is divided by the grid filament resistance of the oscillation tube proper and the variable resistance R of the influencing tube. Superposed upon the fall of potential across the tube R occasioned by the grid direct current, and which varies at the rate and rhythm of $fo$ is the grid alternating voltage $fx$, and the same thus acts like a plate alternating voltage for the influencing tube. It will be understood that an optimum state will evidently arise so far as the self-excitation is concerned when this plate alternating potential $fx$ and similarly the grid alternating voltage $fo$ at tube R are isophasal and positive during the intervals when self-excitation is feasible.

As will be seen, the influencing tube regulates the excitation of the dependent oscillations by bringing action upon the self-excitation. In contradistinction thereto, in the case of grid modulation work, the self-excitation should not be influenced seeing that only the amplitude of the excited oscillation should be controlled. This requirement also led to this situation that grid modulation is employed only in connection with separately excited transmitters just for the purpose of preventing action on the wave generation in the pilot transmitter.

By the new arrangement here disclosed, both a division or submultiplication as well as multiplication of the frequency $fo$ is feasible without any modification in the circuit scheme being necessary. For example, if $fx$ is 10,000 cycles, the exciting or input frequency $fo$ may be, say, 1000 cycles just as well as 100,000 cycles. In the former instance, $fx$ is obtained by multiplication by 10, whereas in the latter instance it is obtained by division at the ratio 10:1. What should also be emphasized is that with an arrangement as hereinbefore disclosed, high divisions are possible in one and the same stage. Indeed, with simple laboratory equipment it has been possible to secure a submultiplication of 100:1. Another step would consist of the simultaneous excitation of two frequencies $fx_1$ and $fx_2$ in a single thermionic generator, as shown in Figure 3, by the use and provision of two suitably tuned oscillation circuits in the plate circuit of the self-excited generator, and, if desired, frequency $fx_1$ could constitute a multiplied frequency, and $fx_2$ a subdivision of $fo$.

Having thus described my invention and the operation thereof, what I claim is:

1. A circuit arrangement for obtaining from a source of primary oscillations a harmonic or subharmonic comprising an electron discharge device oscillation generator having coupled input and output circuits, said output circuit being tuned to a frequency which is different from the frequency of said source of primary oscillations and such that the quotient of the larger of the two frequencies divided by the smaller is an integer, and said input circuit having connected therein a variable resistance whose value is varied at the rhythm of the frequency of the oscillations generated by said source, said resistance comprising an electron discharge device having a control electrode and a cathode across which said source of primary oscillations is coupled.

2. In combination, an electron discharge device comprising a grid, cathode and anode, a parallel tuned circuit coupled to said anode and cathode, another circuit connected between said grid and cathode electromagnetically coupled to said tuned circuit through an inductance coil, said other circuit comprising a second electron discharge device also having a grid, cathode and anode, a source of primary oscillations coupled to said last grid and cathode, said last anode being connected to the cathode of said first device, and the cathode of said second device being coupled to the grid of said first device through said inductance coil, said parallel tuned circuit being tuned to a frequency which bears an integral relation to the frequency of said source of primary oscillations.

3. In combination, an electron discharge device comprising a grid, cathode and anode, a parallel tuned circuit coupled to said anode and cathode, another circuit connected between said grid and cathode electromagnetically coupled to said tuned circuit through an inductance coil, said other circuit comprising a second electron discharge device also having a grid, cathode and anode, a source of primary oscillations coupled to said last grid and cathode, said last anode being connected to the cathode of said first device, and the cathode of said second device being coupled to the grid of said first device through inductance coil, said parallel tuned circuit being tuned to a submultiple of the frequency of said source of primary oscillations, another parallel tuned circuit connected in parallel to said first tuned circuit and tuned to a multiple of the frequency of said source of primary oscillations, and a load circuit coupled to at least one of said tuned circuits.

4. A frequency multiplication circuit for obtaining from a source of primary oscillations a multiple of the frequency generated by said source, comprising an electron discharge device having coupled input and output circuits, said output circuit being tuned to said multiple frequency, and said input circuit having serially connected therein a variable resistance, said source of primary oscillations being coupled to said variable resistance for varying its value at the rhythm of the frequency of oscillations generated by said source.

MAX POHONTSCH.